US012598008B2

(12) United States Patent
Dodgson

(10) Patent No.: US 12,598,008 B2
(45) Date of Patent: Apr. 7, 2026

(54) DETERMINATION OF SIGNAL CHARACTERISTICS

(71) Applicant: Airbus Defence and Space Limited, Stevenage (GB)

(72) Inventor: Terence Dodgson, Stevenage (GB)

(73) Assignee: Airbus Defence and Space GmbH, Stevenage (GB)

( * ) Notice: Subject to any disclaimer, the term of this patent is extended or adjusted under 35 U.S.C. 154(b) by 73 days.

(21) Appl. No.: 18/392,358

(22) Filed: Dec. 21, 2023

(65) Prior Publication Data

US 2024/0214089 A1 Jun. 27, 2024

(30) Foreign Application Priority Data

Dec. 23, 2022 (GB) ..................................... 2219622

(51) Int. Cl.
*H04B 17/336* (2015.01)
*H04B 17/391* (2015.01)

(52) U.S. Cl.
CPC ....... *H04B 17/336* (2015.01); *H04B 17/3913* (2015.01)

(58) Field of Classification Search
CPC .. H04B 17/336; H04B 17/346; H04B 17/309; H04B 10/0795; H04B 17/3913; H04L 25/0254
See application file for complete search history.

(56) References Cited

U.S. PATENT DOCUMENTS

| | | | | |
|---|---|---|---|---|
| 11,545,159 | B1 | 1/2023 | Frenkel et al. | |
| 2001/0026235 | A1* | 10/2001 | Nuijten | H03M 1/0651 341/144 |
| 2005/0226398 | A1* | 10/2005 | Bojeun | H04L 12/2854 379/52 |
| 2019/0031100 | A1* | 1/2019 | Lee | G01S 13/00 |
| 2022/0399945 | A1* | 12/2022 | Frenkel | G10L 17/02 |
| 2023/0062443 | A1* | 3/2023 | Chakraborty | H04W 24/04 |
| 2024/0259247 | A1* | 8/2024 | Thasari | H04L 27/2613 |

FOREIGN PATENT DOCUMENTS

| | | | |
|---|---|---|---|
| CN | 110912629 | A | 3/2020 |
| WO | 2010015371 | A1 | 2/2010 |

OTHER PUBLICATIONS

Great Britain Search Report for corresponding Great Britain Patent Application No. 2219622.4 dated Jul. 25, 2023.
K. Yang et al., "An SNR Estimation Technique Based on Deep Learning" State Key Laboratory of Complex Electromagnetic Environment Effects on Electronics and Information System, National University of Defense Technology, Changsha, China.
(Continued)

*Primary Examiner* — Khanh C Tran
(74) *Attorney, Agent, or Firm* — Greer Burns & Crain Ltd.

(57) ABSTRACT

A method of determining an estimate of a signal-to-noise ratio characteristic of a signal by receiving samples of the signal; extracting, from the samples, values of two or more features indicative of the signal-to-noise ratio characteristic; providing the two or more extracted feature values as inputs to a machine learning agent; and causing the machine learning agent to process the extracted feature values to provide the estimate of the signal-to-noise ratio characteristic.

20 Claims, 11 Drawing Sheets

(56) References Cited

OTHER PUBLICATIONS

Extended European Search Report from corresponding European patent application No. 23219162.7, dated May 17, 2024.

Lu Shen et al., SIDONE: Single-Input Dual-Output Network for Radar Target Detection in Complex Environment, 2021 CIE International Conference on Radar (Radar), IEEE, Dec. 15, 2021, pp. 2263-2266.

Anonymous, machine learning—how and why do normalization and feature scaling work?—cross validated, Nov. 1, 20212, XP055332275, retrieved from the internet: URL:http://stats.stackexchange.com/questions/41704/how-and-why-do-normalization-and-feature-scaling-work (retrieved Jan. 4, 2017).

Examination Report from corresponding European application No. 23219162.7 dated Sep. 16, 2025.

* cited by examiner

100

101 – Receive signal samples

103 – Extract values of two or more features indicative of the SNR characteristic from the samples.

104 – Rescaling the extracted feature values.

105 – Provide the extracted feature values to a machine learning agent.

107 – Process the feature values by the machine learning agent to provide an estimate of SNR characteristic.

300

Number of Hidden Layers: 2

| | Input Layer | Hidden Layer 1 | Hidden Layer 2 | Output Layer |
|---|---|---|---|---|
| No. of Neurons | 11 | 16 | 16 | 13 |
| Activation Functions | ReLU | ReLU | ReLU | Soft Max. |

501 – Receive samples

503 – Extract a value of at least one feature indicative of the characteristic from the samples.

504 – Rescaling the extracted feature values.

505 – Provide the extracted feature value to a machine learning agent.

507 – Process the feature value by the machine learning agent to provide an output indicative of an estimate of the characteristic.

509 – Obtain the estimate of the characteristic by multiplying each element of the vector with its associated predetermined characteristic value.

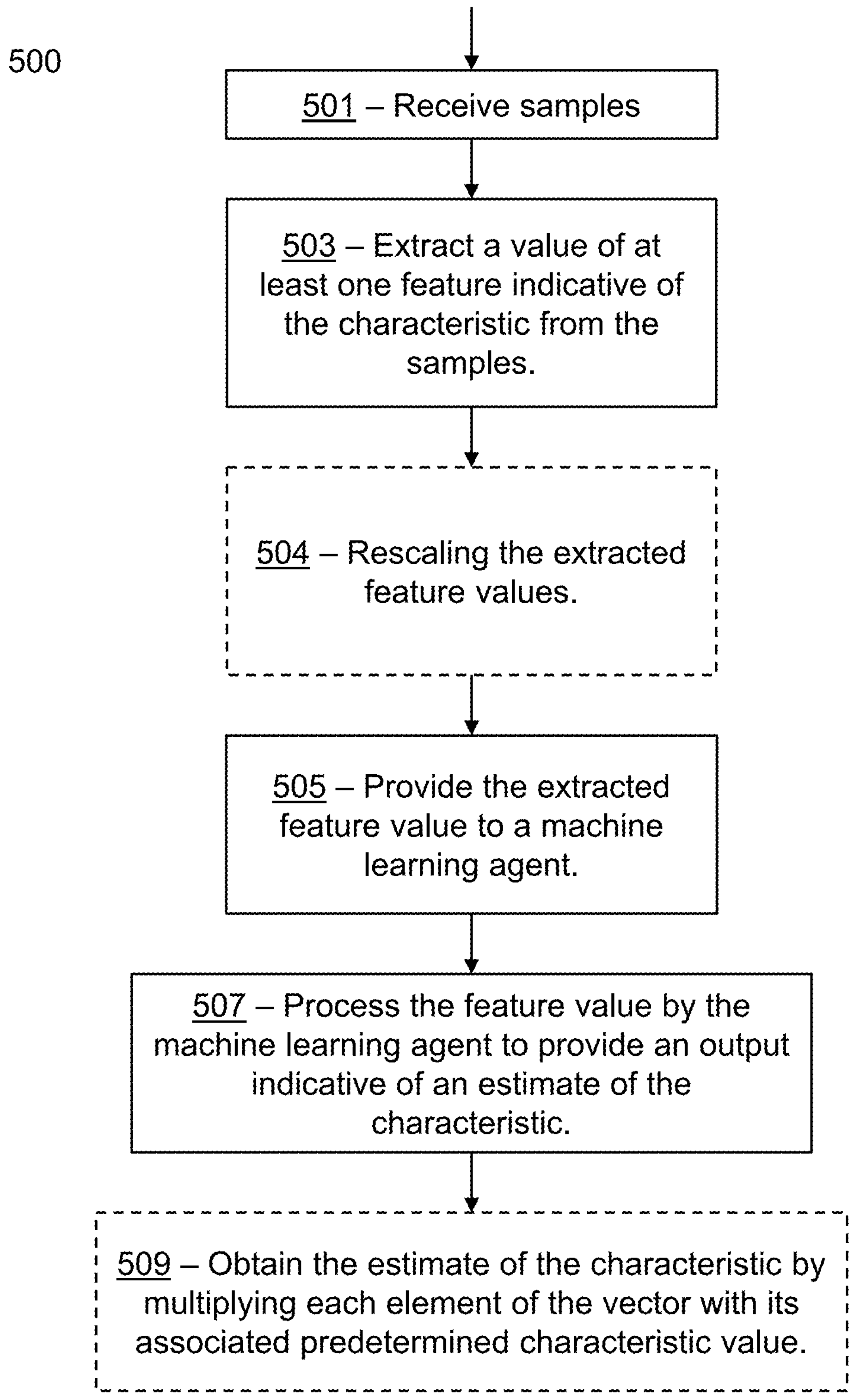

| LUT Index | Corresponding linear SNR values, SNR(n) | ANN Output Target (probability) vector |
|---|---|---|
| 0 | 1.000000000 | 0.0 |
| 1 | 1.258925412 | 0.0 |
| 2 | 1.584893192 | 0.5977 |
| 3 | 1.995262315 | 0.4023 |
| 4 | 2.511886432 | 0.0 |
| 5 | 3.16227766 | 0.0 |
| 6 | 3.981071706 | 0.0 |
| 7 | 5.011872336 | 0.0 |
| 8 | 6.309573445 | 0.0 |
| 9 | 7.943282347 | 0.0 |
| 10 | 10.00000000 | 0.0 |
| 11 | 12.58925412 | 0.0 |
| 12 | 15.84893192 | 0.0 |

$$\sum_{n} p(n) = 1.0$$

Fig. 7

DETERMINATION OF SIGNAL CHARACTERISTICS

CROSS-REFERENCES TO RELATED APPLICATIONS

This application claims the benefit of United Kingdom Patent Application Number 2219622.4 filed on Dec. 23, 2022, the entire disclosure of which is incorporated herein by way of reference.

FIELD OF THE INVENTION

The present disclosure concerns methods of determining signal characteristics. More particularly, but not exclusively, this disclosure concerns measures, including methods, apparatus and computer programs, for use in determining signal characteristics.

BACKGROUND OF THE INVENTION

In communications systems, for example, there is often a need or a desire to calculate a signal-to-noise ratio (SNR) characteristic of a received signal. This can be used to determine expected signal quality or to assist with further performance related measurements such as bit error rate (BER).

Known methods for estimating SNR characteristics include blind methods and data-aided methods. Blind methods refer to estimating the SNR from a received signal when no extra (assisting) data is sent. An example of extra (assisting) data would be a pilot data sequence which is transmitted from the transmitter and known at the receiver. Known blind methods include the second moment, fourth moment (M2M4) estimator and the signal to variance ratio (SVR) estimator. A known data-aided method is the error vector magnitude (EVM).

M2M4 and SVR have the disadvantages of relatively low accuracy and accuracy fluctuation over the range of SNRs they might be used for. Data-aided methods have the disadvantage of requiring the transmission of extra (assisting) data which results in greater power consumption at the transmitter and reduced overall channel capacity for actual data transmission.

SUMMARY OF THE INVENTION

It is an object of the present disclosure to provide improved methods for estimating a signal-to-noise ratio (SNR) characteristic of a received signal, which do not suffer from the disadvantages set out above. In particular, it is an object of the present disclosure to more accurately calculate the Signal to Noise Ratio (SNR) of a transmit/receive system, for example, and to provide consistent accuracy across a relatively large SNR range.

According to a first aspect, there is provided a method of determining an estimate of a signal-to-noise ratio characteristic of a signal, the method comprising, at a processor:

- receiving samples of the signal;
- extracting, from the samples, values of two or more features indicative of the signal-to-noise ratio characteristic;
- providing the two or more extracted feature values as inputs to a machine learning agent; and
- causing the machine learning agent to process the extracted feature values to provide the estimate of the signal-to-noise ratio characteristic.

In embodiments, prior to the step of providing the two or more extracted feature values to the machine learning agent, the method may further comprise adjusting the relative weightings of at least two of the extracted feature values.

Optionally, at least two of the extracted feature values may be normalized. The step of normalizing may comprise rescaling each extracted feature value based on a predetermined mean and/or standard deviation of the respective feature. After normalization, for each feature, the mean of the feature values may be equal to zero and the standard deviation of the feature values may be equal to one. In embodiments, a loop for continuous or periodic updating of the mean and standard deviation may be provided, to account for non-stationary signal statistics.

The signal-to-noise ratio characteristic may be the ratio of the signal power to the noise power, expressed either on a decibel scale or a linear scale. Alternatively, the signal-to-noise ratio characteristic may be the signal-to-noise ratio per bit, $E_b/N_0$.

The machine learning agent may comprise an artificial neural network, ANN. The ANN may have multiple output neurons which are combined. In this manner, the accuracy of the estimation may be improved.

The two or more features may comprise the maximum received signal amplitude and/or the minimum received signal amplitude.

The two or more features may comprise the in-phase part, $\mu_r$, of the mean of the signal samples, $M_1$ and/or the quadrature part $\mu_i$ of the mean of the signal samples, wherein $$M_1 = \mu_r + j \cdot \mu_i = \frac{1}{N}\sum_{t=0}^{t=N-1} z_t,$$

wherein N is the total number of samples, $z_t$.

The two or more features may comprise the variance, $M_2$, of the signal samples, wherein $$M_2 = \frac{1}{N}\sum_{t=0}^{t=N-1} (z_t - M_1)(z_t - M_1)^*,$$

wherein $M_1$ is the mean of the signal samples, $z_t$, and N is the total number of samples.

The two or more features may comprise the in-phase part, $\alpha_r$, of the third moment of the signal samples, $M_3$, wherein $$\alpha_r = \frac{1}{N \cdot M_2^{3/2}}\sum_{t=0}^{t=N-1} (x_t - \mu_r)^3$$

and/or the wherein quadrature part, $\alpha_i$, of the third moment, $$\alpha_i = \frac{1}{N \cdot M_2^{3/2}}\sum_{t=0}^{t=N-1} (y_t - \mu_i)^3,$$

wherein $M_2$ is the variance of the signal samples $z_t = x_t + j \cdot y_t$ and N is the total number of samples.

The two or more features may comprise the fourth moment of the signal samples, $M_4$, wherein $$M_4 = \frac{1}{N}\sum_{t=0}^{t=N-1} [(z_t - M_1)(z_t - M_1)^*]^2,$$

N is the total number of samples $z_t$, and $M_1$ is the first moment.

The two or more features may comprise the Kurtosis value, which is given by the fourth moment of the signal samples, $M_4$, normalized by the second moment squared of the signal samples, $M_2^2$, wherein $$M_4 = \frac{1}{N}\sum_{t=0}^{t=N-1}[(z_t - M_1)(z_t - M_1)^*]^2,$$

N is the total number of samples $z_t$, $$M_2 = \frac{1}{N}\sum_{t=0}^{t=N-1}(z_t - M_1)(z_t - M_1)^*,$$

and wherein $M_1$ is the mean of the signal samples.

The two or more features may comprise the critical part, λ, of the $M_2M_4$ estimator of the signal samples, wherein $$\lambda = 2 \cdot M_2^2 - M_4,$$

wherein $$M_4 = \frac{1}{N}\sum_{t=0}^{t=N-1}[(z_t -$$

$$M_1)(z_t - M_1)^*]^2,$$

N is the total number of samples $z_t$, $$M_2 = \frac{1}{N}\sum_{t=0}^{t=N-1}(z_t - M_1)(z_t -$$

$$M_1)^*,$$

and wherein $M_1$ is the mean of the signal samples.

The two or more features may comprise the critical part, β, of the signal to variance ratio, wherein $$\beta = \frac{\alpha}{M_4 - \alpha},$$

and $$\alpha = \Sigma(z_n z_n^*)(z_{n-1} z_{n-1}^*).$$

In embodiments, prior to the step of providing the two or more extracted feature values as inputs to the machine learning agent, the methods may further comprise performing an initial training process of the machine learning agent, wherein the initial training process is continued until a pre-determined accuracy is achieved.

In embodiments, the method may further comprise periodically updating the training of the machine learning agent when in use. Updating the training of the machine learning agent may be performed on the basis of the received signal samples.

In embodiments, the method comprises extracting, from the samples, values of 10 or more features (or 15 or more features) indicative of the signal-to-noise ratio characteristic and providing all of the extracted feature values as inputs to a machine learning agent. Any feature that varies as a function of the signal-to-noise ratio characteristic may be used.

In embodiments, prior to the step of extracting, from the samples, values of two or more features indicative of the signal-to-noise ratio characteristic, there is no prior signal processing (such as framing, windowing or performing a fast Fourier transform, for example). In this manner, the two or more feature values are extracted directly from the received signal samples.

In embodiments, the signal is a time-domain signal and the step of extracting, from the samples, values of two or more features indicative of the signal-to-noise ratio characteristic is performed in the time domain.

According to a second aspect, there is provided a computer program comprising a set of instructions, which, when executed by computerized apparatus, cause the computerized apparatus to perform a method of determining an estimate of a signal-to-noise ratio characteristic of a signal, the method comprising:

receiving samples of the signal;

extracting, from the samples, values of two or more features indicative of the signal-to-noise ratio characteristic;

providing the two or more extracted feature values as inputs to a machine learning agent; and causing the machine learning agent to process the extracted feature values to provide the estimate of the signal-to-noise ratio characteristic.

According to a third aspect, there is provided apparatus for determining an estimate of a signal-to-noise ratio characteristic of a signal, the apparatus comprising a processor configured to:

receive samples of the signal;

extract, from the samples, values of two or more features indicative of the signal-to-noise ratio characteristic;

provide the two or more extracted feature values as inputs to a machine learning agent; and causing the machine learning agent to process the extracted feature values to provide the estimate of the signal-to-noise ratio characteristic.

According to a fourth aspect, there is provided a method of determining an estimate of a characteristic of a signal, the method comprising, at a processor:

receiving samples of the signal;

extracting, from the samples, values of two or more features indicative of the characteristic;

providing the two or more extracted feature values as inputs to a machine learning agent; and causing the machine learning agent to process the extracted feature values to provide the estimate of the characteristic.

It will of course be appreciated that features described in relation to one aspect may be incorporated into other aspects.

BRIEF DESCRIPTION OF THE DRAWINGS

Embodiments of the present disclosure will now be described by way of example only with reference to the accompanying schematic drawings of which:

FIG. 3 illustrates properties of an artificial neural network (ANN) according to embodiments of the disclosure;

FIG. 5 is a flow diagram corresponding to a method of determining a characteristic of a set of samples according to embodiments of the disclosure;

FIG. 7 also illustrates probability vectors which form the output of the ANN according to embodiments of the disclosure;

DETAILED DESCRIPTION OF THE PREFERRED EMBODIMENTS

Figure 1:
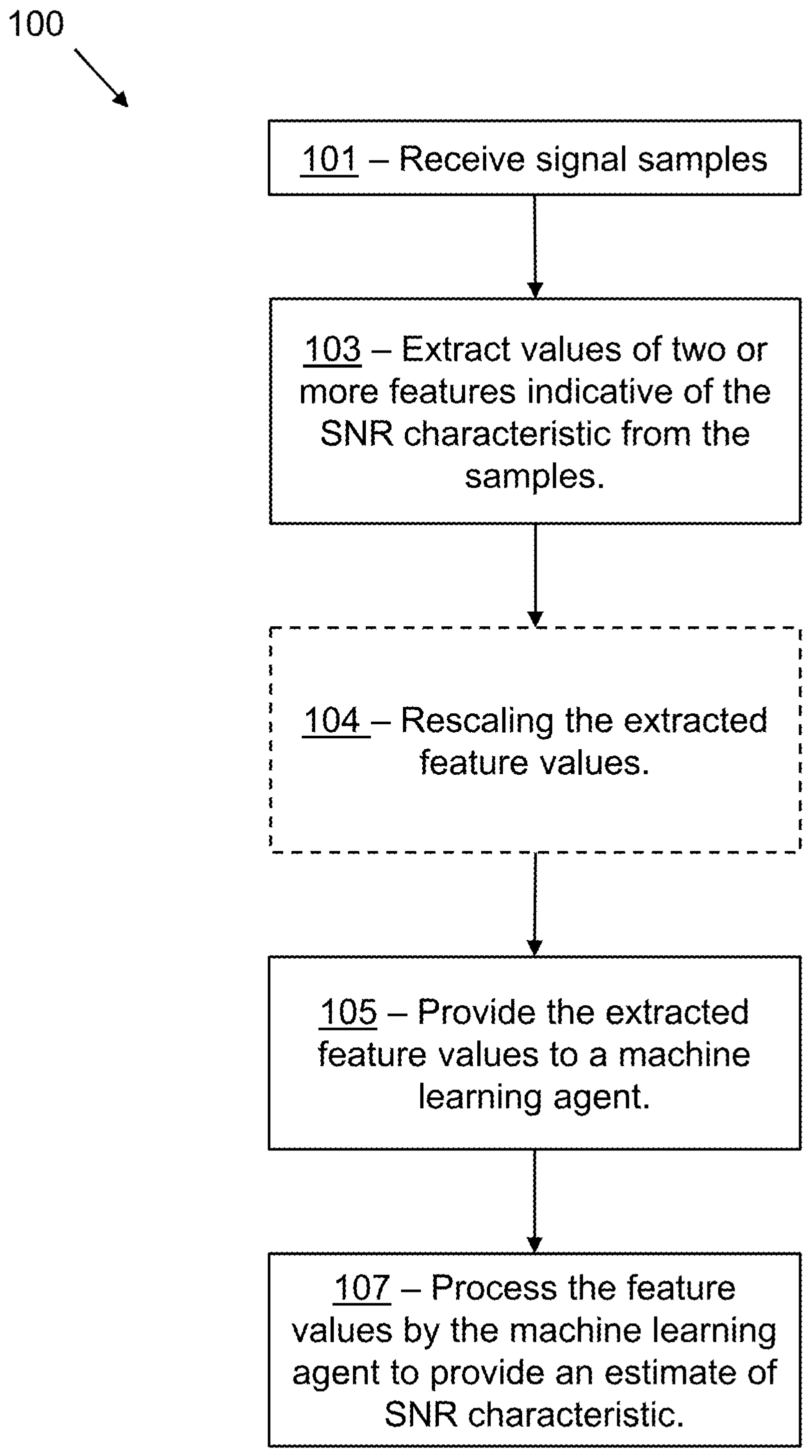
FIG. 1 is a flow diagram corresponding to a method of determining a signal-to-noise ratio (SNR) characteristic of a signal according to embodiments of the disclosure.

FIG. 1 is a flow diagram corresponding to a method 100 of determining an estimate of a signal-to-noise ratio (SNR) characteristic of a signal according to embodiments of the disclosure. In a first step 101, the method comprises receiving samples of the signal at a processor 220. Then in a following step 103, values of two or more different features indicative of the signal-to-noise ratio characteristic are extracted from the samples. Examples of such features for estimating an SNR characteristic of a signal are given below. In embodiments, in a following, optional step 104 the extracted feature values are rescaled, as expanded upon below. In a following step 105, the two or more extracted feature values are provided as inputs to a machine learning agent. In a final step 107, the extracted feature values are processed by the machine learning agent to provide the estimate of the signal-to-noise ratio characteristic.

Figure 2:
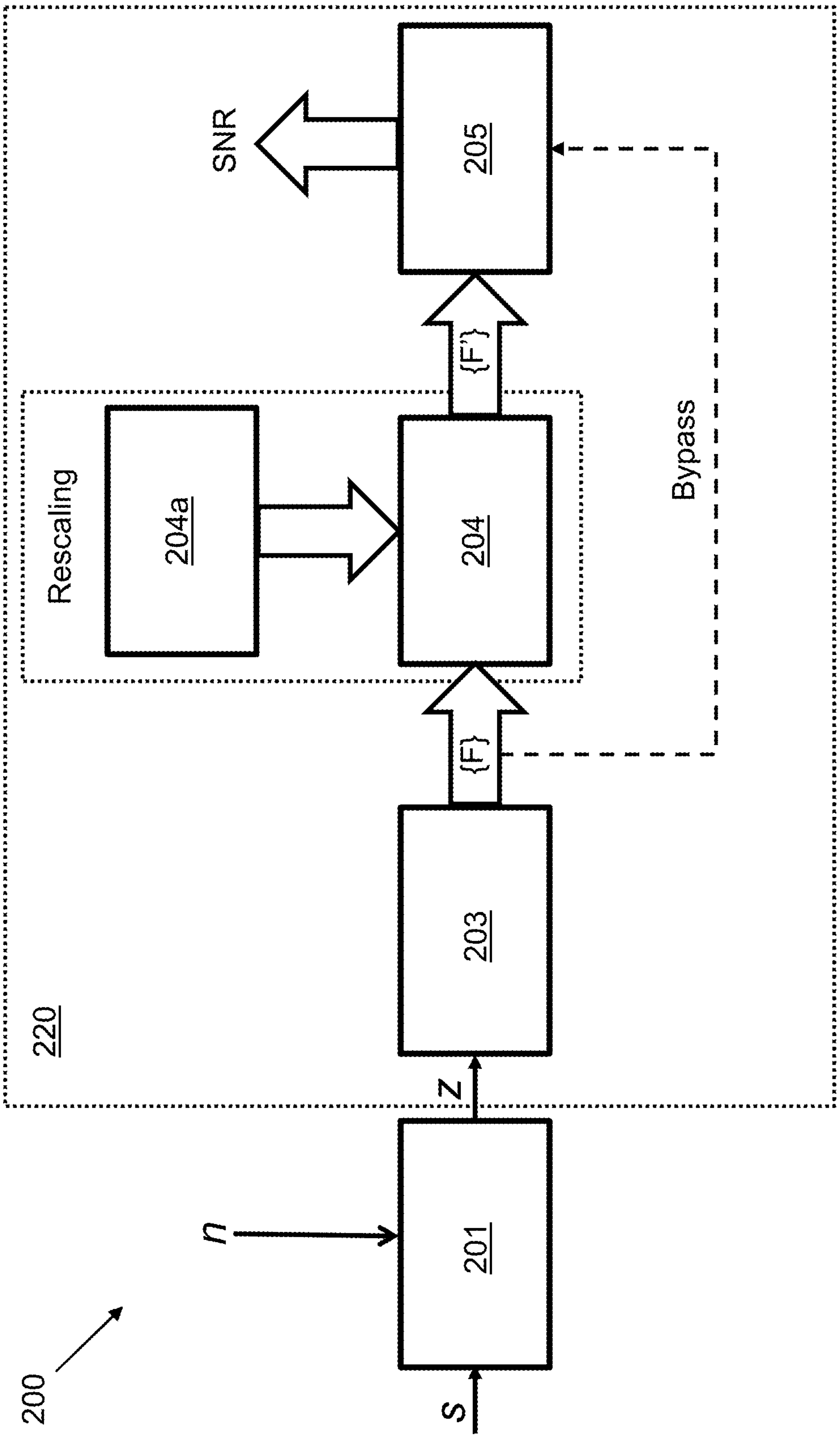
FIG. 2 is a block diagram representing a communications system implementation of the method of FIG. 1.

FIG. 2 is a block diagram 200 representing a communications system implementation of the method of FIG. 1 according to embodiments of the present disclosure. A clean, transmitted (Tx) signal, s=x+jy, with transmit power S, is seen on the left of FIG. 2. This is the signal at transmission time. The signal from which a single-to-noise ratio (SNR) characteristic is to be estimated is the received (noisy) version of this signal, z, which will constitute the clean signal, s=x+jy, with e.g. channel and/or system noise, $n=n_x+jn_y$ (having noise power N). z is thus a complex signal sequence of noisy complex samples given by $z=(x+n_x)+j(y+n_y)=s+n$. The noisy channel is represented by block 201 in FIG. 2. The SNR characteristic may be the ratio of the signal power to the noise power, S/N, expressed either on a decibel scale or on a linear scale. Alternatively, or additionally, the SNR characteristic may be the Energy per bit to Noise density ratio, $E_b/N_o$. Region 220 represents a processor which processes the noisy, received signal z according to the methods disclosed herein.

Next, in block 203, values of two or more different features {F} indicative of the SNR characteristic to be estimated are extracted from the received signal samples, z. Features indicative of the SNR characteristic should be understood to mean features derived from the signal samples that in some way vary in accordance with the SNR characteristic and that are therefore sensitive to different values of the SNR characteristic. Many such features are envisaged as being applicable to methods according to the present disclosure.

For example, in embodiments the two or more features comprise the maximum received signal amplitude and/or the minimum received signal amplitude. In embodiments, the two or more extracted features comprise the in-phase part, $\mu_r$, of the mean of the signal samples, $M_1$ and/or the quadrature part $\mu_i$ of the mean of the signal samples, wherein $$M_1 = \mu_r + j\cdot\mu_i = \frac{1}{N}\sum_{t=0}^{t=N-1} z_t,$$

wherein Nis the total number of samples, $z_t$. In embodiments, the two or more features comprise the variance, $M_2$, of the signal samples, wherein $$M_2 = \frac{1}{N}\sum_{t=0}^{t=N-1} (z_t - M_1)(z_t - M_1)^*.$$

In embodiments, the two or more features comprise the in-phase part, $\alpha_r$, of the third moment, $M_3$, wherein $$\alpha_r = \frac{1}{N\cdot M_2^{3/2}}\sum_{t=0}^{t=N-1} (x_t - \mu_r)^3$$

and/or the quadrature part, $\alpha_i$, of the third moment, wherein $$\alpha_i = \frac{1}{N\cdot M_2^{3/2}}\sum_{t=0}^{t=N-1} (y_t - \mu_i)^3.$$

In embodiments, the two or more features comprise the fourth moment, $M_4$, wherein $$M_4 = \frac{1}{N}\sum_{t=0}^{t=N-1} \left[(z_t - M_1)(z_t - M_1)^*\right]^2.$$

In embodiments, the two or more features comprise the Kurtosis value, which is given by the fourth moment, $M_4$, normalized by the second moment squared, $M_2^2$. In embodiments, the two or more features comprise the critical part, $\lambda$, of the $M_2M_4$ estimator, wherein $$\lambda = 2\cdot M_2^2 - M_4.$$

In embodiments, the two or more features comprise the critical part, β, of the signal to variance ratio, wherein $$\beta = \frac{\alpha}{M_4 - \alpha},$$

and $$\alpha = \Sigma(z_n z_n^*)(z_{n-1} z_{n-1}^*).$$

It should be appreciated that in methods according to embodiments of the present disclosure, unlike prior art SNR estimators, the extracted features are not limited to a particular sub-set of the received signal features. For example, the M2M4 estimator is limited to the first, second and fourth moment features, and the SVR estimator is limited to the first, fourth and pre-post fourth moment.

Following feature value extraction in block 203, methods according to embodiments of the present disclosure may proceed directly to block 205 (i.e., following the path labelled "Bypass" in FIG. 2). In this manner, the two or more extracted feature values {F} are provided directly as inputs to a machine learning agent, such as an artificial neural network (ANN), for example. The machine learning agent is represented by block 205. The machine learning agent processes the extracted feature values {F} to provide an estimate of the SNR characteristic. Specific, example implementation details are expanded upon below.

Alternatively, following feature extraction in block 203, methods according to embodiments of the present disclosure may then proceed to block 204, which represents a rescaling process. In embodiments, the rescaling involves adjusting the relative weightings of at least two of the extracted feature values. By way of example, suppose two of the extracted features consist of the maximum received signal amplitude and the minimum received signal amplitude. For a given communications system, each of these features will have a typical range of values. As an example, adjusting the relative weightings of at least two of the extracted feature values may involve multiplying the maximum received signal amplitude by a factor of 1.5 and leaving the minimum received signal amplitude unchanged, thereby weighting the maximum received signal amplitude 50% more than the minimum received signal amplitude.

In embodiments, the rescaling involves normalizing at least two of the extracted features. Normalization may mean, for example, that after normalization, the mean of each of the feature values is equal to zero and the standard deviation of each of the feature values is equal to one. By way of example, suppose two of the at least two extracted features consist of the maximum received signal amplitude and the minimum received signal amplitude. For a given communications system each of these features will have a typical range of values. This range can be determined during training of the machine learning agent, or from real-world measurements. Then, the rescaling process may involve subtracting, from each value of the maximum received signal amplitude (corresponding to a value obtained from a given set of received signal samples, e.g., 1024 samples), the mean maximum received signal amplitude, and dividing each value of the maximum received signal amplitude by the standard deviation of the maximum received signal amplitude. The same applies, mutatis mutandis, to other extracted features, such as the minimum received signal amplitude, for example.

In this manner, due to normalization, the extracted features have similar weightings which may improve the ability of the machine learning agent to process the different features equally. For example, there may be some features that have absolute values which are very large and others that are very small. In order to ensure smaller values are not "swamped" by larger values, the input features are normalized to their means and standard deviations. To do this, a pre-run may be carried out using, for example, the statistics calculator described in currently unpublished United Kingdom Patent Application Nos. GB2213111.4 and GB2213110.6 by the same applicant. Alternatively, other methods of calculating the normalization factors may be used, such as classical formulae for the standard deviation and mean, for example. The rescaling factors may be stored in a memory, represented by block 204*a*. The rescaling factors may be updated from time to time, either in an offline process or by updating them in real-time.

Following rescaling, the rescaled feature values {F'} are then passed to block 205, where the estimate of the SNR characteristic is determined by the machine learning agent, in the manner described above.

FIG. 3 illustrates properties of a machine learning agent 300 according to an embodiment. In this embodiment, an ANN is used as the machine learning agent. The input layer has 11 inputs, the output layer has 13 outputs and two hidden layers are employed, each having 16 nodes. "ReLU" denotes "RectiLinear Unit" and "Soft Max" represents a function that turns a vector of K real values into a vector of K real values that sum to 1. This is used to normalize the output vector, as is described in more detail below.

Figure 4:
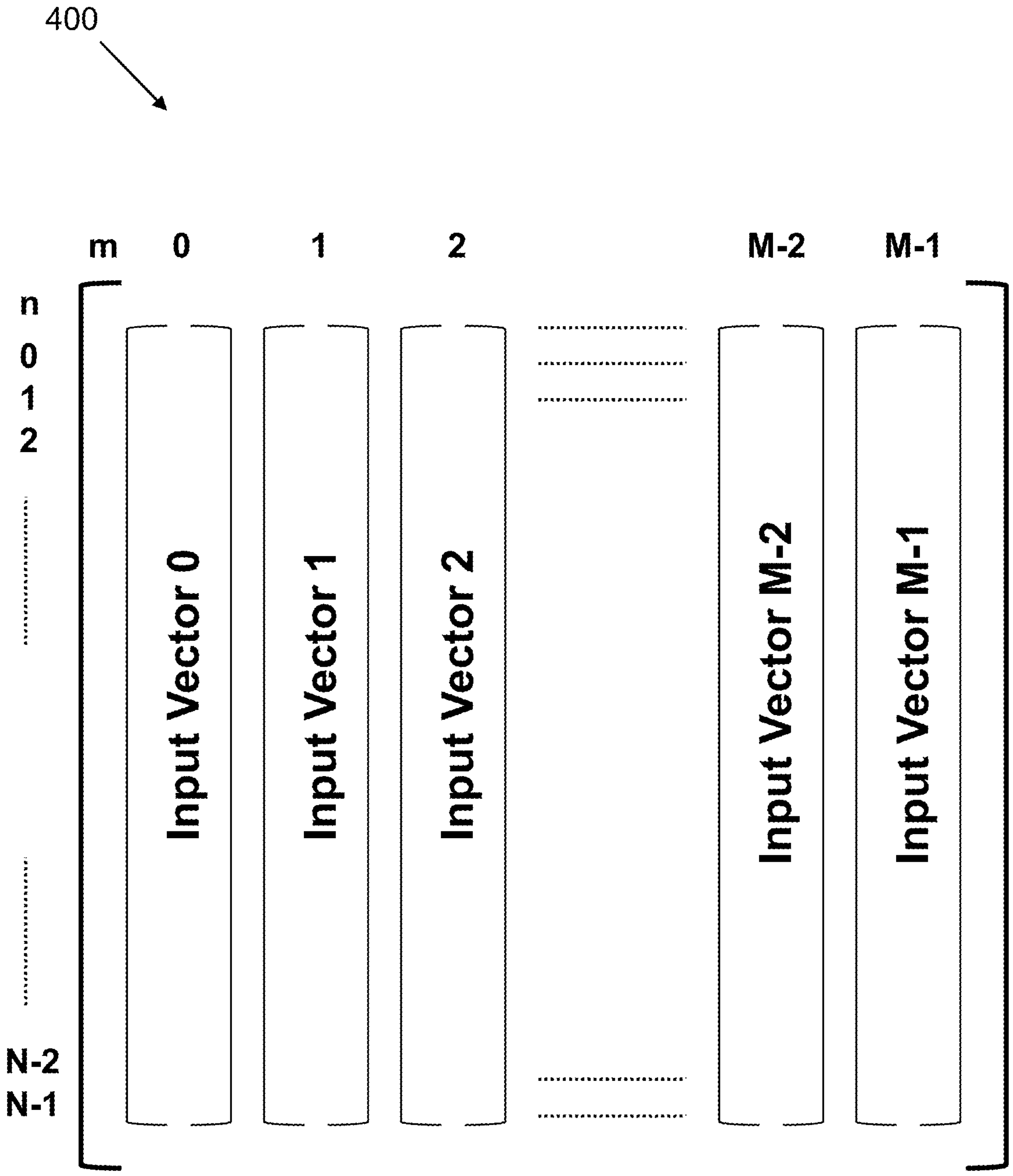
FIG. 4 illustrates how inputs to the ANN can be represented by a matrix of column vectors according to embodiments of the disclosure.

Attention is now turned to how the input and output vectors to and from the machine learning agent are constructed. In embodiments, the ANN uses a mini batch processing method of the type known in the art. Accordingly, the inputs to the ANN can be represented by a matrix of column vectors. If all of the 11 features described above are used, each column vector has 11 elements (numbered n=0 to n=N−1, where N=11) corresponding to the features (either rescaled, normalized or unscaled). A typical batch size may be 128 column vectors (numbered m=0 to m=M−1, where M=128). Such a mini batch input is shown in FIG. 4. The batch size represents the number of feature vectors given to the ANN for each forward and backward processing/training iteration.

Turning attention to the machine learning agent (e.g. ANN) output, in embodiments the output comprises a vector comprising elements corresponding to the probabilities of different predetermined characteristic (e.g. SNR) values. FIG. 5 is a flow diagram corresponding to a method 500 of determining an estimate of a characteristic of a set of samples according to embodiments of the disclosure. In a first step 501, the method comprises receiving the samples at a processor. Next, in step 503, a value of at least one feature indicative of the characteristic is extracted from the samples. In embodiments, in a following, optional step 504, the extracted feature values are rescaled. Next, in step 505, the at least one extracted feature value is provided as an input to a machine learning agent (e.g., an ANN). Next, in step 507, the machine learning agent processes the at least one extracted feature value to provide an output indicative of the estimate of the characteristic. The output of the machine learning agent is a vector comprising elements corresponding to the probabilities associated with different predetermined characteristic values. In a final, optional step 509, in embodiments the estimate of the characteristic is obtained by multiplying each element of the vector with its associated predetermined characteristic value.

The method 500 described with reference to FIG. 5 is applicable to any general set of samples and any characteristic that it is desired to estimate from the samples. For example, the samples could be samples of a medical image and the characteristic could be bone density. However, specific embodiments of this method are described herein with reference to the communications system of FIG. 2, in which the samples correspond to samples of a (received) signal and the characteristic is a signal-to-noise ratio characteristic (expressed either in dBs, on a linear scale, or $E_b/N_0$, for example). The method 500 enables the machine learning agent to output any real value in a specified range (i.e., the output is not restricted to integer values). This is illustrated below with two specific examples.

Figure 6:
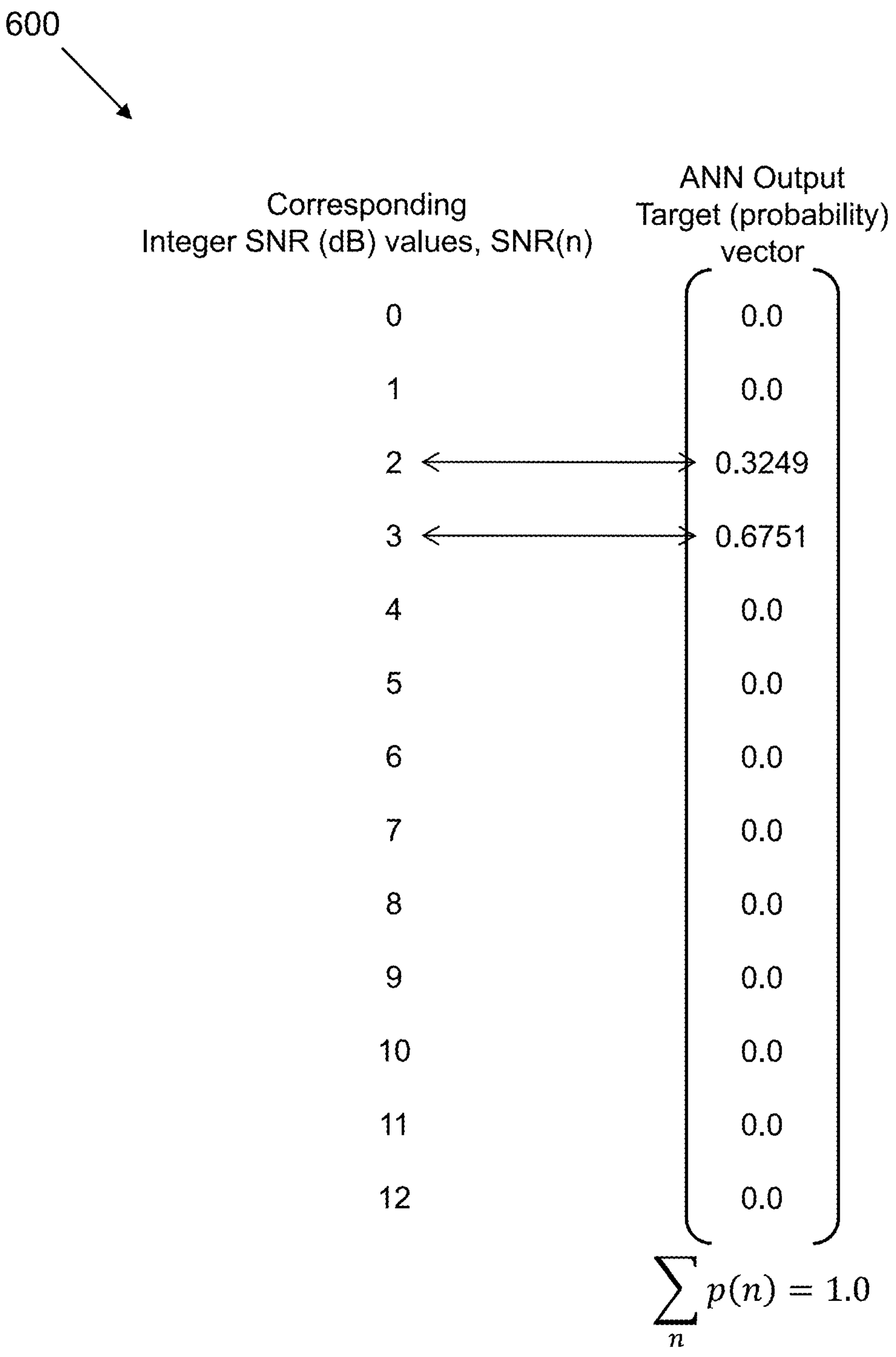
FIG. 6 illustrates probability vectors which form the output of the ANN according to embodiments of the disclosure.

With each system, a range can be identified, the minimum value of which is the minimum SNR, $SNR_{min}$, that can occur in the system and the maximum value corresponding to the maximum SNR, $SNR_{max}$, that can occur in the system. During training of the ANN, an nth output target probability vector, {p(n)} is generated by first generating an nth random target SNR value (used to train the system), $SNR_n$. The next step is to determine the two integer SNR values that $SNR_n$ lies between. SNRs can be expressed in dBs or in linear numbers (note: when linear numbers are used a further step is generally employed in terms of generating a SNR/probability look-up table—this is explained later). With reference to FIG. 6, as an example of when the characteristic is the SNR expressed in dBs, if a random SNR of 2.6751 dB is generated as part of the ANN training, then the two integer dB values that this value lies between can be found by calculating {$SNR_L$=FLOOR($SNR_n$), $SNR_U$=CEIL($SNR_n$)} which will give {$SNR_L$=2, $SNR_U$=3}, i.e., as expected 2.6751 dB lies between $SNR_L$=2 dB and $SNR_U$=3 dB. Note "FLOOR" and "CEIL" refer to rounding the value down and up to the nearest integer respectively. In an example system, the range of SNR of interest may be 0 dB to 12 dB. Working directly with dB and with this range enables the integer dB values to also represent the vector element number (which also goes from 0 to 12).

Continuing with this example, the output probability vector will have 13 elements, each being representative of the probability of occurrence of the corresponding, integer, SNR value (in dB). Denoting the probability vector by {p(n)}, where p(0) can be read as the probability that a SNR value of 0 dB occurs, p(1) can be read as the probability that a SNR value of 1 dB occurs, p(2) can be read as the probability that a SNR value of 2 dB occurs, then, having found the two integer values the randomly generated $SNR_n$ value lies between, two probability relationships should hold. The first is that the sum of the lower SNR value, $SNR_L$, multiplied by its probability, p($SNR_L$), and the upper SNR value, $SNR_U$, multiplied by its probability, p($SNR_U$), is equal to the randomly generated value, $SNR_n$=2.6751, i.e.:

$$SNR_n = SNR_L.p(SNR_L) + SNR_U.p(SNR_U)$$

Accordingly, in embodiments, the method further comprises obtaining the estimate of the characteristic, i.e., $SNR_n$, by multiplying each element of the probability vector with its associated predetermined characteristic value, as represented by the equation above.

A second relationship stems from the fact that, since some value must always occur, the sum of all probabilities in the vector should be equal to 1. However all p(n), except p($SNR_L$) and p($SNR_U$) will be zero, hence the second relationship is that the sum of the probabilities associated with the lower and upper integer SNRs should be equal to 1, i.e.:

$$1.0 = p(SNR_L) + p(SNR_U)$$

These two equations can be solved to find p($SNR_L$) and p($SNR_U$)—used to train the ANN. In the example, 2.6751=2·p(2)+3·p(3), and 1.0=p(2)+p(3). Solving gives p(2)=0.3249 and p(3)=0.6751. The output probability vector derived for the randomly generated SNR of 2.6751 dB is thus {0.0, 0.0, 0.3249, 0.6751, 0.0, 0.0, 0.0, 0.0, 0.0, 0.0, 0.0, 0.0, 0.0}, as seen in FIG. 6.

A further example is now illustrated with reference to FIG. 7. Here, the signal characteristic being estimated is the SNR expressed on a linear scale, as opposed to being expressed in dBs. There is no longer a direct relationship between the SNR value (since it is now linear) and the element index value in the vector, as seen in FIG. 7. In this example, keeping the SNR range the same (0 to 12 dB), the corresponding linear range can be seen to be 1.0 to 15.84893192. A similar process is followed, whereby a random target SNR is generated, in the example this value is $SNR_n$=1.75 (lin.) and the two values, held in a Look Up Table (LUT), between which $SNR_n$ lies is found (in the example, this corresponds to $SNR_L$=1.584893192, and, $SNR_U$=1.995262315). The lower value, $SNR_L$, is then taken as the value previous to $SNR_U$. Following a process similar to that described above with reference to FIG. 6, with $SNR_L$=1.584893192 (from LUT) and $SNR_U$=1.995262315 and using the index of each to determine where the output probabilities will lie in the target (probability) vector gives p(2)=0.59766269, and, p(3)=0.40233731. The output probability vector derived for the randomly generated SNR of 1.75 (lin.) is thus {0.0, 0.0, 0.59766269, 0.40233731, 0.0, 0.0, 0.0, 0.0, 0.0, 0.0, 0.0, 0.0, 0.0}, as seen in FIG. 7.

For training of the ANN, the target vectors (derived in the manner described above) are used as the first step during the back propagation of the ANN. The target vectors are compared to the ANN output—which is first normalized because the ANN output vectors should also be probabilistic in nature, that is, the sum of all the elements when expressed in probability form must equal 1.0. The elements, {$\hat{q}_n$}, of each ANN un-normalized output vector, $v_o$, from the ANN (after forward propagation is complete) are normalized by the sum of all the elements in that vector, to form the probability vector, $v_p$, with probability elements, {$q_n$}, i.e.:

$$q_n = \frac{\hat{q}_n}{\Sigma_n \hat{q}_n}$$

Figure 8:
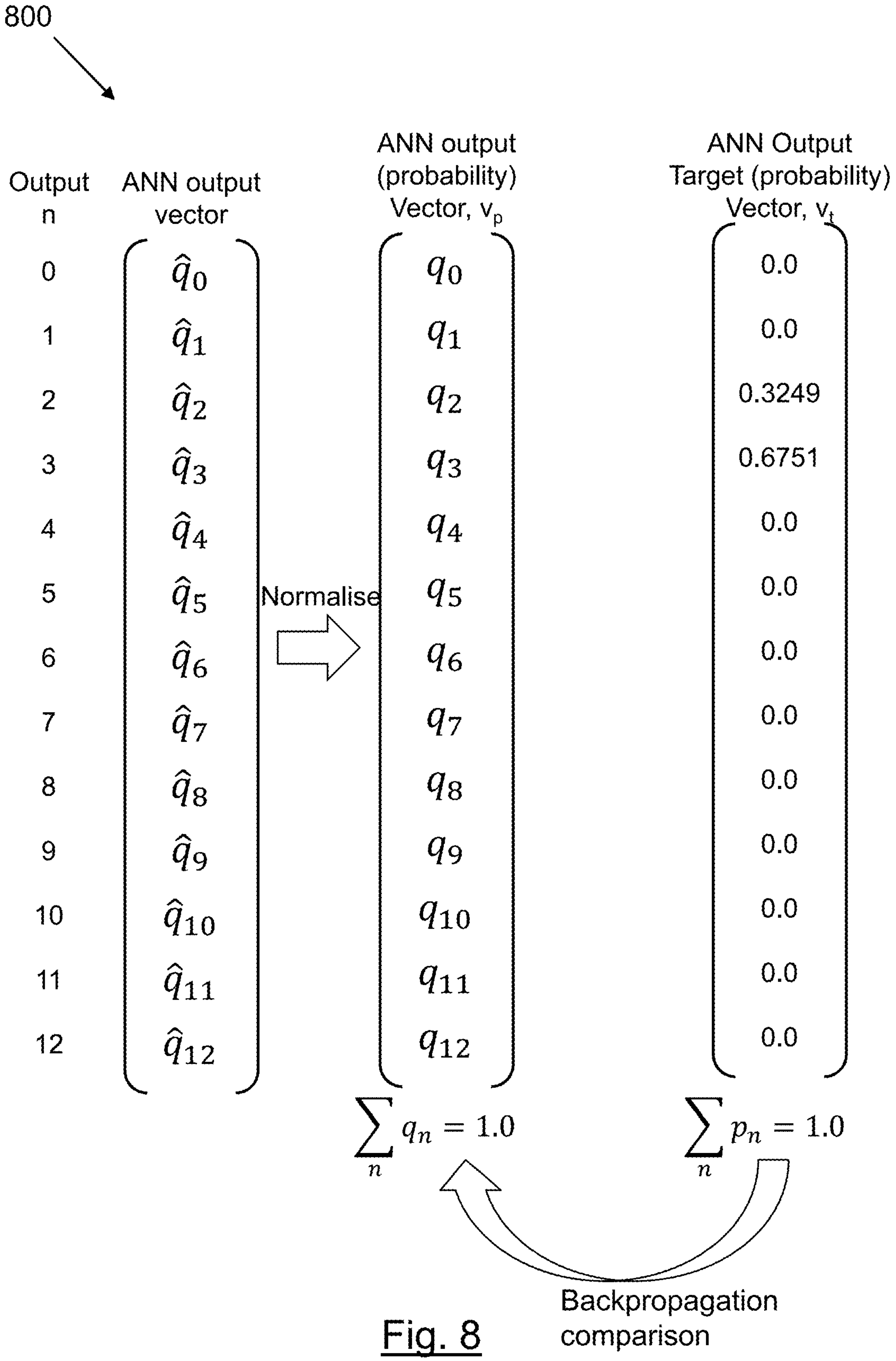
FIG. 8 illustrates back propagation, construction and comparison of ANN output probability vectors and ANN output target (probability) vectors according to embodiments of the disclosure.

The first stage of training: back propagation, construction and comparison of ANN output probability vectors, {vp} and ANN output target (probability) vectors, {$v_t$} is indicated in FIG. 8. It will be appreciated that in embodiments, prior to the step of providing the two or more extracted feature values as inputs to the machine learning agent, an initial training process of the machine learning agent is performed. The initial training process is continued until a pre-determined accuracy is attained. Furthermore, the machine learning agent may undergo additional training in use. In a communications system, this additional training/learning may be based on actual received signal samples, for example.

Figure 9:
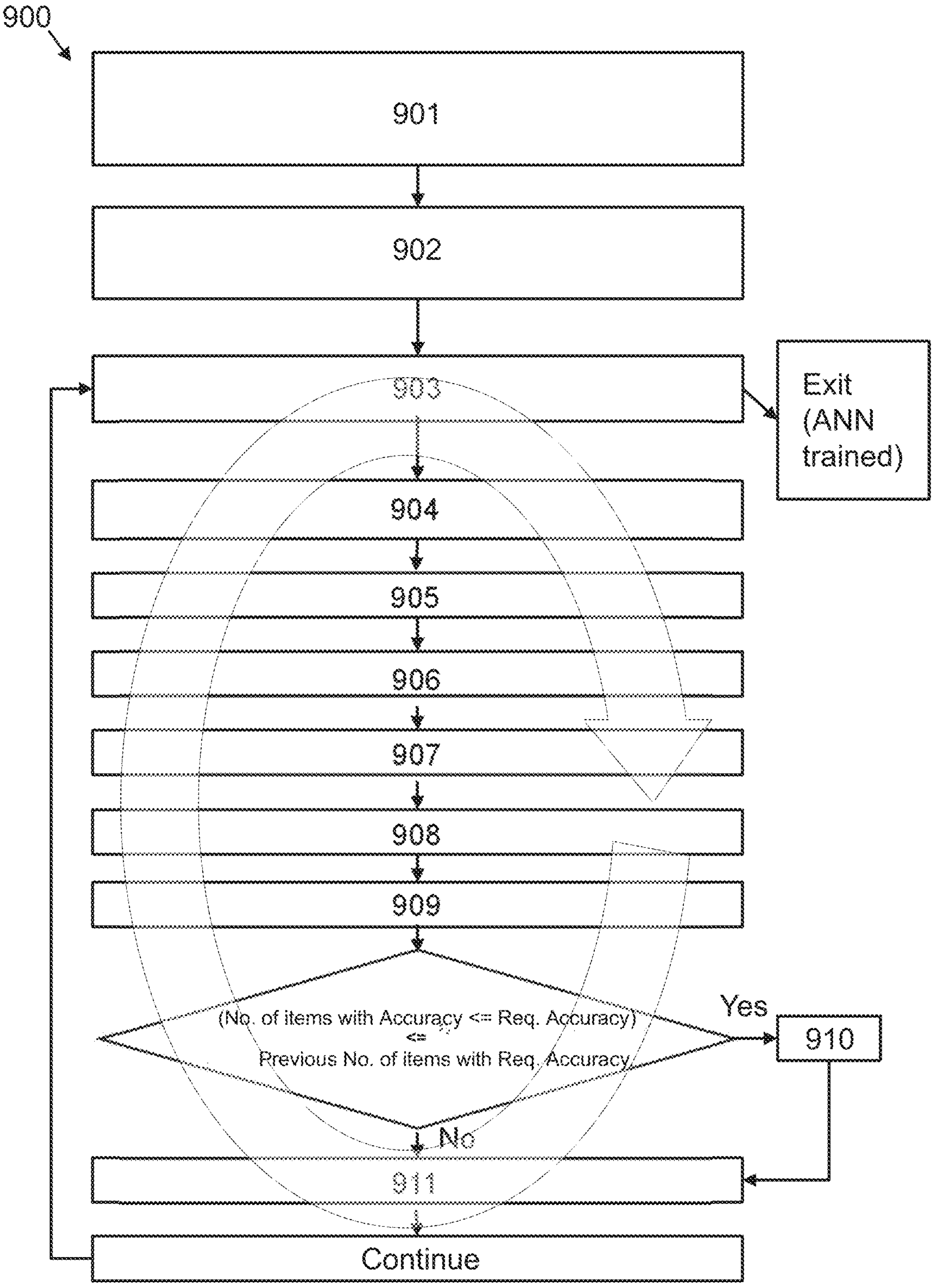
FIG. 9 is a flow diagram that represents an example of training an ANN to be able to estimate the SNR of a received signal in a communications system according to embodiments of the disclosure.

FIG. 9 is a flow diagram 900 that represents an example of the processing to train an ANN to be able to estimate the SNR of a received signal in a communications system. The start of the process 901 involves reading in the communication system parameters, reading in the ANN parameters, setting up required random number generators, assigning dynamic memory storage and initializing ANN weights and biases. A pre-processing loop 902 is then executed, in order to derive the normalization parameters (with reference to blocks 204*a* and 204 in FIG. 2) for the features which will be derived from the noisy, received, signal. In this example, these normalization parameters are then frozen—they could however be updated on a continuous basis and used on a dynamic basis. Once the normalization parameters have been found, the process enters the ANN training loop at 903. The first part/module in the loop is to generate, in step 904:

(1) Input (mini batch) data—a matrix of input vectors, the elements of each vector correspond to feature values, as explained above; and (2) Output target probability vectors (together with the associated channel SNR value—to be used later in the loop).

This is then followed, at 905, by generating the communications system outputs which then have, at step 906, (channel) noise added to them. The noisy communications system outputs (after the channel) are then used in step 907 to form the ANN (normalized) input features—using the normalization parameters found in the earlier pre-processing stage. The ANN input features are formatted into a matrix (a mini batch), each column of which is a vector of features (11 features in this example).

The mini batch is then subject, in step 908, to ANN forward propagation to generate the ANN outputs. These outputs are then processed as detailed above, i.e., to normalize them. After this processing, there will exist a set of ANN-derived SNR output probability vectors, which are then turned into the ANN output $E_b/N_0$ or SNR estimates. These estimates are then compared, in step 909, with the target values to see how many of the processed ANN output estimates are within a specified distance (e.g., 0.1 dB) from the target value. The number with the required accuracy is compared to the last highest number (obtained from a previous pass through the loop). If the current number is higher than the last highest number, the ANN weights and biases are written to an output (text file) in step 910, i.e., stored, and the last highest number is replaced with the current number (the current number might also be stored in the text file to enable processing to carry on from the last best result should the number of iterations through the training loop prove to be insufficient for appropriate convergence). In step 911, ANN back propagation is then carried out, using, for example, the Statistical Gradient Descent (SGD), Batch Gradient Descent (BGD) or Mini Batch Gradient Descent (MBGD), as in this example method together with Adaptive Moments (ADAM) optimization.

If the number of training epochs/iterations has not been exceeded, the process loops back and continues. If the number of training epochs/iterations has been equaled the process will stop. Should the accuracy and training results prove to be acceptable, the weights and biases can then be frozen, the training loop can be removed and the (trained) ANN can be used as a plug-in module to a communications system for estimating an SNR characteristic of a signal.

An example communications system has been modelled/simulated and results indicate that the methods disclosed herein exceed the performance of standard, classical, methods in two ways:

(1) More accurate values at any given $E_b/N_0$ or SNR; and (2) More consistently accurate values over the entire range of $E_b/N_0$ or SNR of interest.

Figure 10:
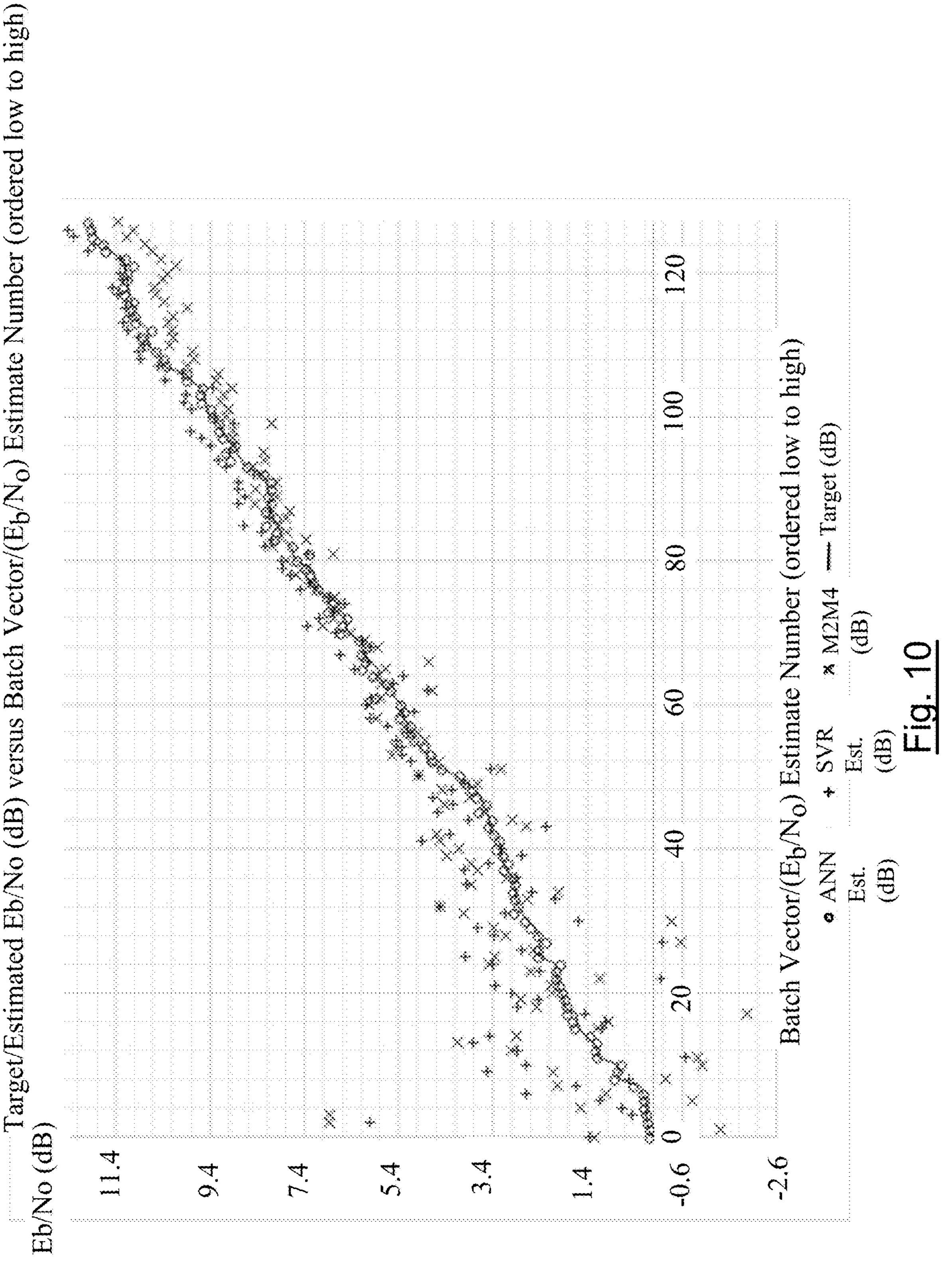
FIG. 10 shows simulated results for SNR estimation using methods according to the present disclosure and using classical methods; and, FIG. 11 shows simulated results for SNR estimation using methods according to the present disclosure and using classical methods.
Figure 11:
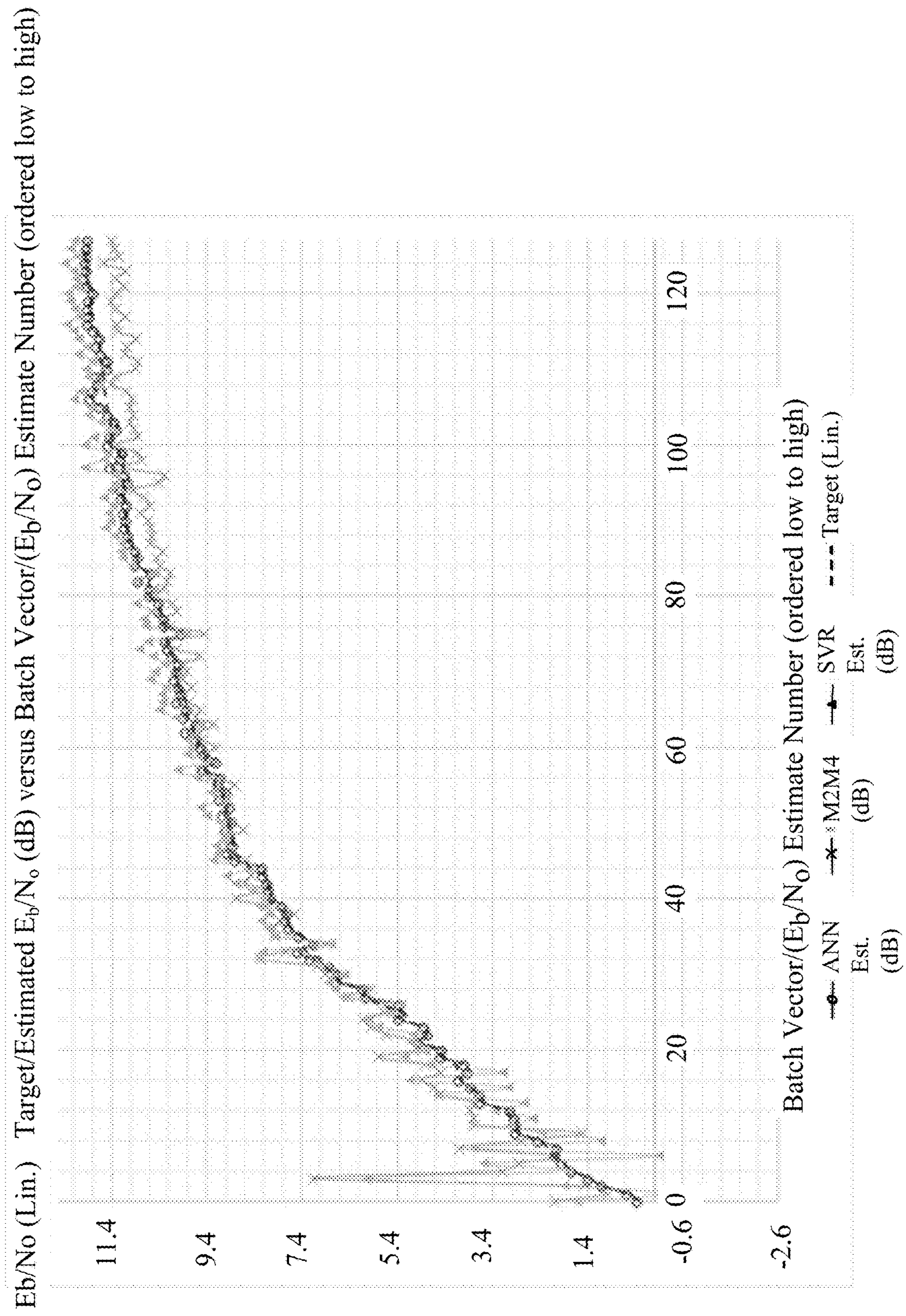

Graphs that indicate this are given in FIG. 10 (SNR in dBs) and FIG. 11 (linear SNR). FIG. 10 is a snapshot of 128 random SNR estimations (in dBs) where the method has over 79% of its batch estimations within 0.1 dB of the actual value. FIG. 11 is a snapshot of 128 random SNR estimations (linear) where the method has over 75% of its instantaneous batch estimations within 0.1 (linear) of the actual value. It shall be noted that methods according to the present disclosure outperform the two classical methods known as the SVR and M2M4 methods.

It should be appreciated that the method described with reference to FIG. 1, and other Figures herein, is also applicable to determining an estimate of any general characteristic of a signal. Accordingly, the present disclosure also provides a method of determining an estimate of a characteristic of a signal. The method comprises, at a processor: receiving samples of the signal; extracting, from the samples, values of two or more features indicative of the characteristic; providing the two or more extracted feature values as inputs to a machine learning agent; and causing the machine learning agent to process the extracted feature values to provide the estimate of the characteristic.

Methods according to embodiments of the present disclosure may be applied to any type of signal, for example any digitally modulated signal. In embodiments, more than two features indicative of the signal-to-noise ratio characteristic may be input to the machine learning agent. For example, at least 10 features may be used, or at least 15 features may be used. In general, any features which vary with signal to noise ratio may be used. In this manner, the machine learning agent itself is allowed to determine what is relevant information and what is not, i.e., no pre-selection of a subset of specific features is necessary.

In embodiments, the signal samples may be fed directly to feature extraction without any prior, intervening signal processing steps (such as framing, windowing or performing a Fourier transform). In this manner, methods according to embodiments of the disclosure can work in the time domain (although features from the frequency domain could also be used). Avoiding the use of a Fourier transform reduces complexity and may improve the latency associated with the signal-to-noise estimation. Furthermore, methods according to embodiments of the disclosure do not require any prior information about the codec involved in the encoding of the signal of which the signal-to-noise ratio is to be determined. It should be appreciated that methods according to embodiments of the disclosure can provide an analogue (i.e. continuous) value for the estimate of the signal to noise ratio, as opposed to a discretized estimate or a threshold estimate (i.e., whether the SNR is merely “good” or “bad”, for example). It should be appreciated that according to embodiments of the disclosure, a direct SNR estimation is obtained, and methods disclosed herein may not require any post-processing or formula-based mapping of the output of the machine learning agent.

In embodiments, it is not required to define anything such as an SNR “class”, for example. In this manner, an accurate estimation of the SNR can be obtained with no class association. Embodiments of the disclosure consider an entire, analogue, SNR range (from minimum expected to maximum expected), without the need for training data subsets to estimate SNR.

The methods as described above may each be comprised in or implemented in apparatus comprising a processor or processing system. The processing system may comprise one or more processors and/or memory. One or more aspects of the embodiments described herein comprise processes performed by apparatus. In some examples, the apparatus comprises one or more processing systems or processors configured to carry out these processes. In this regard, embodiments may be implemented at least in part by computer software stored in (non-transitory) memory and executable by the processor, or by hardware, or by a combination of tangibly stored software and hardware (and tangibly stored firmware). Embodiments also extend to computer programs, particularly computer programs on or in a carrier, adapted for putting the above-described embodiments into practice. The program may be in the form of non-transitory source code, object code, or in any other non-transitory form suitable for use in the implementation of processes according to embodiments. The carrier may be any entity or device capable of carrying the program, such as a RAM, a ROM, or an optical memory device, etc.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method of determining an estimate of a signal-to-noise ratio characteristic of a signal, the method, executed by a processor, comprising:

receiving samples of a signal;

extracting, from the samples, values of two or more features indicative of a signal-to-noise ratio characteristic;

providing the two or more extracted feature values as inputs to a machine learning agent;

prior to the step of providing the two or more extracted feature values to the machine learning agent, adjusting a relative weightings of at least two of the two or more extracted feature values; and causing the machine learning agent to process the two or more extracted feature values to provide an estimate of the signal-to-noise ratio characteristic.

2. The method of claim 1, further comprising:

prior to the step of providing the two or more extracted feature values to the machine learning agent, normalizing at least two of the two or more extracted feature values.

3. The method of claim 2, wherein the step of normalizing comprises:

rescaling each extracted feature value based on a predetermined mean, a standard deviation, or both for the respective extracted feature value.

4. The method of claim 3, wherein after normalization, for each extracted feature value, a mean of the two or more extracted feature values is equal to zero and a standard deviation of the two or more extracted feature values is equal to one.

5. The method of claim 1, wherein the signal-to-noise ratio characteristic is a ratio of a signal power to a noise power, expressed either on a decibel scale or a linear scale.

6. The method of claim 1, wherein a signal-to-noise ratio characteristic is a signal-to-noise ratio per bit, $E_b/N_0$.

7. The method of claim 1, wherein the machine learning agent comprises an artificial neural network, ANN.

8. The method of claim 1, wherein the two or more extracted feature values comprise a maximum received signal amplitude, or a minimum received signal amplitude, or both.

9. The method of any preceding claim, wherein the two or more extracted feature values comprise an in-phase part, $\mu_r$, of a mean of the signal samples, $M_1$ or a quadrature part $\mu_i$ of a mean of the signal samples, or both, and wherein $$M_1 = \mu_r + j.\mu_i = \frac{1}{N}\sum_{t=0}^{t=N-1} z_t,$$

wherein N is a total number of samples, $z_t$.

10. The method of claim 1, wherein the two or more extracted feature values comprise a variance, $M_2$, of the signal samples, wherein $$M_2 = \frac{1}{N}\sum_{t=0}^{t=N-1} (z_t - M_1)(z_t - M_1)^*,$$

wherein $M_1$ is a mean of the signal samples, $z_t$, and N is a total number of samples.

11. The method of claim 1, wherein the two or more extracted feature values comprise am in-phase part, $\alpha_r$, of a third moment of the signal samples, $M_z$, wherein $$\alpha_r = \frac{1}{N.M_2^{3/2}}\sum_{t=0}^{t=N-1} (x_t - \mu_r)^3,$$

a quadrature part, $\alpha_i$, of a third moment, wherein $$\alpha_i = \frac{1}{N.M_2^{3/2}}\sum_{t=0}^{t=N-1} (y_t - \mu_i)^3,$$

or both, and, wherein $M_2$ is a variance of the signal samples $z_t=x_t+jy_t$ and N is a total number of samples.

12. The method of claim 1, wherein the two or more extracted feature values comprise a fourth moment of a signal samples, $M_4$, wherein $$M_4 = \frac{1}{N}\sum_{t=0}^{t=N-1}[(z_t - M_1)(z_t - M_1)^*]^2,$$

N is a total number of samples $z_t$, and $M_1$ is a first moment.

13. The method of claim 1, wherein the two or more extracted feature values comprise a Kurtosis value, which is given by a fourth moment of the signal samples, $M_4$, normalized by a second moment squared of the signal samples, $M_z^2$, wherein $$M_4 = \frac{1}{N}\sum_{t=0}^{t=N-1}[(z_t - M_1)(z_t - M_1)^*]^2,$$

N is a total number of samples $z_t$, $$M_2 = \frac{1}{N}\sum_{t=0}^{t=N-1}(z_t - M_1)(z_t - M_1)^*,$$

and wherein $M_1$ is a mean of the signal samples.

14. The method of claim 1, wherein the two or more extracted feature values comprise a critical part, λ, of an $M_2M_4$ estimator of the signal samples, wherein $$\lambda = 2.M_2^2 - M_4,$$

wherein $$M_4 = \frac{1}{N}\sum_{t=0}^{t=N-1}[(z_t - M_1)(z_t - M_1)^*]^2,$$

N is a total number of samples $z_t$, $$M_2 = \frac{1}{N}\sum_{t=0}^{t=N-1}(z_t - M_1)(z_t - M_1)^*,$$

and wherein M, is a mean of the signal samples.

15. The method of claim 1, wherein the two or more extracted feature values comprise a critical part, β, of a signal to variance ratio, wherein $$\beta = \frac{\alpha}{M_4 - \alpha},$$

and $$\alpha = \sum(z_n z_n^*)(z_{n-1} z_{n-1}^*).$$

wherein $$M_4 = \frac{1}{N}\sum_{t=0}^{t=N-1}[(z_t - M_1)(z_t - M_1)^*]^2,$$

N is a total number of samples $z_t$, $$M_2 = \frac{1}{N}\sum_{t=0}^{t=N-1}(z_t - M_1)(z_t - M_1)^*,$$

wherein M, is a mean of the signal samples.

16. The method of claim 1, further comprising:

prior to the step of providing the two or more extracted feature values as inputs to the machine learning agent, performing an initial training process of the machine learning agent, wherein the initial training process is continued until a pre-determined accuracy is achieved.

17. The method of claim 16, further comprising:

periodically updating a training of the machine learning agent when in use.

18. The method of claim 17, wherein updating the training of the machine learning agent is performed on based on the received signal samples.

19. A non-transitory computer readable media storing a computer program comprising a set of instructions, which, when executed by a computerized apparatus, cause the computerized apparatus to perform a method of determining an estimate of a signal-to-noise ratio characteristic of a signal, the method comprising:

receiving samples of a signal;

extracting, from the samples, values of two or more features indicative of a signal-to-noise ratio characteristic;

providing the two or more extracted feature values as inputs to a machine learning agent;

prior to the providing the two or more extracted feature values to the machine learning agent, adjusting a relative weightings of at least two of the two or more extracted feature values and causing the machine learning agent to process the two or more extracted feature values to provide an estimate of the signal-to-noise ratio characteristic.

20. An apparatus for determining an estimate of a signal-to-noise ratio characteristic of a signal, the apparatus comprising:

a processor configured to:

receive samples of a signal;

extract, from the samples, values of two or more features indicative of a signal-to-noise ratio characteristic;

provide the two or more extracted feature values as inputs to a machine learning agent;

prior to providing the two or more extracted feature values to the machine learning agent, adjust a relative weightings of at least two of the two or more extracted feature values and cause the machine learning agent to process the two or more extracted feature values to provide an estimate of the signal-to-noise ratio characteristic.

* * * * *